(12) United States Patent
Ishikura et al.

(10) Patent No.: US 6,219,125 B1
(45) Date of Patent: Apr. 17, 2001

(54) ELECTRODE PLATE, PROCESS FOR PRODUCING THE PLATE, FOR AN LCD HAVING A LAMINATED ELECTRODE WITH A METAL NITRIDE LAYER

(75) Inventors: Junri Ishikura, Tokyo; Makoto Kameyama, Funabashi; Hiroyuki Tokunaga, Fujisawa; Toshiaki Yoshikawa, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/899,057

(22) Filed: Jul. 23, 1997

(30) Foreign Application Priority Data

Jul. 26, 1996 (JP) .................................... 8-198029

(51) Int. Cl.$^7$ ................................................ G02F 1/1343
(52) U.S. Cl. .............................. 349/147; 349/148
(58) Field of Search .................................. 349/147, 148, 349/187

(56) References Cited

U.S. PATENT DOCUMENTS

| | | | |
|---|---|---|---|
| 4,485,265 | * | 11/1984 | Gordon et al. ................ 136/255 |
| 5,591,480 | * | 1/1997 | Weisman et al. .............. 349/187 |
| 5,605,858 | * | 2/1997 | Nishioka et al. ............... 437/60 |
| 5,777,710 | * | 7/1998 | Okada et al. ................... 349/148 |
| 5,835,171 | * | 11/1998 | Hanazawa et al. ............ 349/148 |
| 5,859,683 | * | 1/1999 | Tagusa et al. ................. 349/138 |

FOREIGN PATENT DOCUMENTS

| | | |
|---|---|---|
| 02301907 | 12/1990 | (JP) . |
| 06310512 | 11/1994 | (JP) . |
| 93-22145 | 12/1990 | (KR) . |

* cited by examiner

Primary Examiner—Walter J. Malinowski
(74) Attorney, Agent, or Firm—Fitzpatrick, Cella, Harper & Scinto

(57) ABSTRACT

An electrode plate, suitable for constituting a liquid crystal device, includes a light-transmissive substrate, a plurality of first electrodes disposed on the light-transmissive substrate and a plurality of second electrodes disposed on the first electrodes. Each first electrode comprises a layer of metal nitride and is electrically connected with an associated second electrode, and each second electrode comprises a transparent electrode. The electrode plate is effective in improving an adhesiveness between the first electroded and the light-transmissive substrate and an antioxidizing property of the first electrodes while ensuring a good electrical connection state between the first electrodes and the second electrodes.

40 Claims, 8 Drawing Sheets

ELECTRODE PLATE, PROCESS FOR PRODUCING THE PLATE, FOR AN LCD HAVING A LAMINATED ELECTRODE WITH A METAL NITRIDE LAYER

FIELD OF THE INVENTION AND RELATED ART

The present invention relates to an electrode plate, particularly an electrode plate provided with a specific metal electrode and a transparent electrode formed thereon and a production process of the electrode plate. The present invention also relates to a liquid crystal device including the electrode plate and a production process thereof.

On light-transmissive (glass) substrates of twisted nematic (TN)-type or super twisted nematic (STN)-type liquid crystal devices, there have generally been conventionally formed ITO (indium tin oxide) films as transparent electrodes. However such ITO films constituting the transparent electrodes have a fairly high resistivity, so that they have caused a problem of a voltage waveform deformation (or distortion) due to electrical signal delay along with increases in size and resolution of a display area in recent years. Particularly, in liquid crystal devices using a ferroelectric liquid crystal, this problem has become more noticeable since such devices have included a cell structure having a smaller cell gap (e.g., 1.0–2.0 $\mu$m).

In order to solve the problem, it may be possible to increase the thickness of the transparent electrodes, but the formation of such thick transparent electrodes requires increased time and cost and results in an inferior adhesiveness to the substrates.

In order to solve the above-mentioned problems, it has been proposed an electrode plate having structure in which a plurality of metal (e.g., Al) electrodes showing a low resistivity are formed on a glass substrate and a plurality of transparent electrodes of e.g., ITO film formed on the metal electrodes so as to be electrically connected therewith.

In recent years, there has also been proposed an electrode plate using metal electrodes of Cu showing a further low resistivity in order to provide a larger opening region (wider optical modulation region) and a higher response speed to a resultant liquid crystal device.

However, in the case where such an electrode plate using Cu electrodes showing a resistivity lower than Al electrodes is used for providing a liquid crystal device having a larger opening region and an improved responsiveness, the resultant liquid crystal device is accompanied with problems such that an adhesiveness between Cu electrodes and a glass substrate is liable to be lowered and that Cu electrodes are liable to be corroded due to oxidation thereof.

Further, when a polymeric material (e.g., ultraviolet (UV)-curable resin) is filled in spacings between Cu electrodes shaped in a prescribed pattern by using a press (e.g., roller press) to form a flattened surface, a small amount of the polymeric material remains on the surface of Cu electrodes. As a result, each Cu electrode has failed to ensure a good and stable electrical connection with an associated transparent electrode of, e.g., indium tin oxide (ITO) in some cases.

SUMMARY OF THE INVENTION

In view of the above-mentioned problems, a principal object of the present invention is to provide an electrode plate capable of improving adhesive properties (adhesiveness) between metal (first) electrodes and a substrate having thereon the metal electrodes while suppressing an oxidation of the metal electrodes and capable of providing a stable electrical conduction of the metal electrodes to transparent (second) electrodes formed thereon, and a liquid crystal device including such an electrode plate.

Another object of the present invention is to provide processes for producing an electrode plate and a liquid crystal device as described above.

According to the present invention, there is provided an electrode plate, comprising: a light-transmissive substrate, a plurality of first electrodes disposed on the light-transmissive substrate and a plurality of second electrodes disposed on the first electrodes, wherein each first electrode comprises a layer of metal nitride and is electrically connected with an associated second electrode, and each second electrode comprises a transparent electrode.

According to the present invention, there is also provided a process for producing an electrode plate comprising a light-transmissive substrate, a plurality of first electrodes disposed on the light-transmissive substrate and a plurality of second electrodes disposed on the first electrodes; said process comprising the steps of:

forming on a light-transmissive substrate a plurality of first electrodes each comprising a layer of metal nitride, and forming on the first electrodes a plurality of second electrodes each comprising a transparent electrode so as to be electrically connected with an associated first electrode.

According to the present invention, there is further provided a liquid crystal device, comprising: pair of plates and a liquid crystal disposed between he electrode plates; at least one of the plates comprising a light-transmissive substrate, a plurality of first electrodes disposed on the light-transmissive substrate and a plurality of second electrodes disposed on the first electrodes, wherein each first electrode comprises a layer of metal nitride and is electrically connected with an associated second electrode, and each second electrode comprises a transparent electrode.

According to another aspect of the present invention, there is still further provided a process for producing a liquid crystal device, comprising the steps of:

providing a pair of electrode plates at least one of which is produced by the process as described above, disposing the electrode plates opposite to each other while leaving a gap therebetween, and filling the gap with a liquid crystal.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
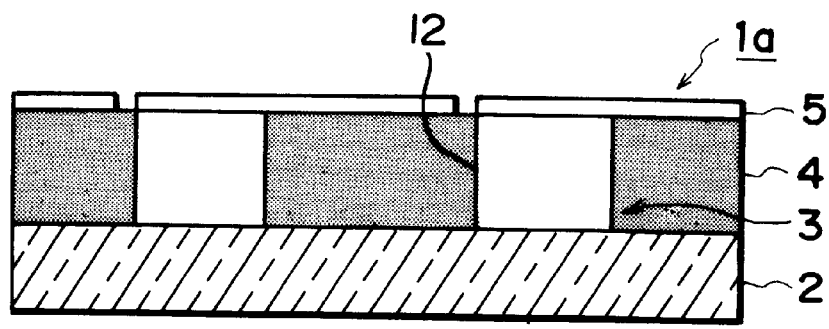
FIGS. 1–5 are schematic sectional views each showing an embodiment of an electrode plate according to the present invention.

Hereinbelow, preferred embodiments of the present invention will be described with reference to FIGS. 1–6. In these figures, identical reference numerals are used for describing identical structural members or materials, unless otherwise noted.

In the present invention, each metal (first) electrode formed on a light-transmissive substrate (e.g., glass substrate) essentially comprises a layer of metal nitride and may have a single layer structure of a principal electroconductive layer comprising Cu as a main component and a lamination layer structure of plural layers including the principal electroconductive layer.

Examples of such a lamination layer structure may include: a layer structure of an adhesive layer and a principal electroconductive layer; a layer structure of a principal electroconductive layer and a protective layer; and a layer structure of an adhesive layer, a principal electroconductive layer and a protective layer, respectively formed in this order on the light-transmissive (glass) substrate. Between the adhesive layer and the principal electroconductive layer, a mixing layer may be disposed.

FIGS. 1–5 shows electrode plates 1a–1e employing the above-described layer structures of the metal electrodes.

More specifically, referring to FIGS. 1–5, each of the electrode plates 1a–1e comprise a glass substrate 2, a plurality of metal (first) electrodes 3 disposed on the glass substrate 2 with spacings, a layer of a polymeric material (e.g., UV-cured resin) 4 disposed at the spacings, and a plurality of transparent (second) electrodes 5 of, e.g., ITO disposed on the metal electrodes 3 and the polymeric material layer 4 so that each transparent electrode 5 is electrically connected with an associated metal electrode 3.

Figure 4:
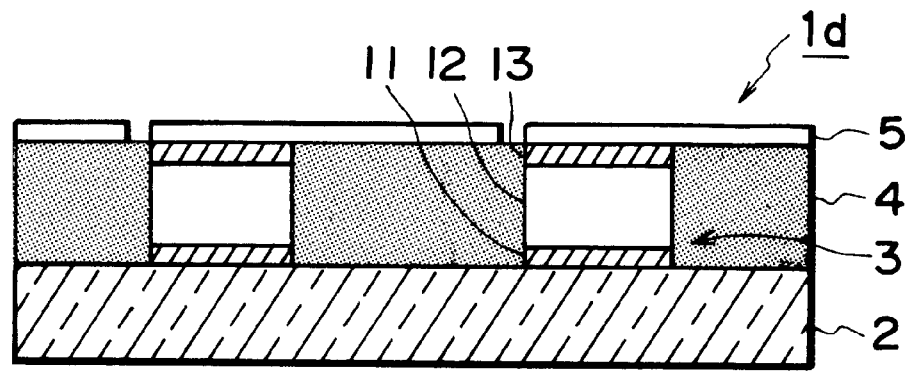
Figure 5:
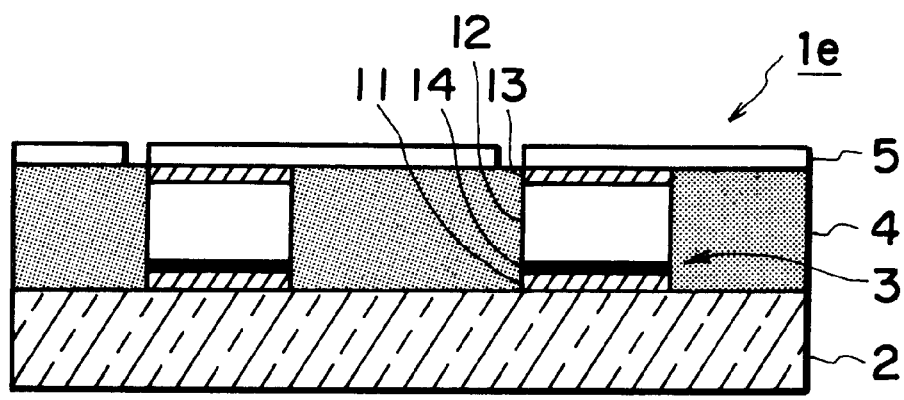

The metal electrode 3 has a single layer structure of a principal electroconductive layer 12 as shown in FIG. 1 and a lamination layer structure of: an adhesive layer 11 and the principal electroconductive layer 12 (FIG. 2); the principal electroconductive layer 12 and a protective layer 13 (FIG. 3); the adhesive layer 11, the principal electroconductive layer 12 and the protective layer 13 (FIG. 4); and the adhesive layer 11, a mixing layer 14, the principal electroconductive layer 12 and the protective layer 13 (FIG. 5).

In each metal electrode 3, the adhesive layer 11 may preferably comprise a material of a metal or alloy selected from the group consisting of Cu, Ni, Mo, Cr, W, Ta, Al and Ag. The adhesive layer 11 may preferably have a thickness of 0.01–0.3 μm in order to improve an adhesiveness between the glass substrate 2 and the metal electrodes 3. When the adhesive layer 11 comprises a layer of metal nitride, the adhesiveness can be further improved.

The principal electroconductive layer 12 comprises a layer of copper (Cu) or a layer of copper and nitrogen (i.e., copper nitride). When a layer of copper nitride is used as the principal electroconductive layer 12, it is possible to improve the adhesiveness between the glass substrate 2 and the metal electrodes 3. The principal electroconductive layer 12 may preferably have a thickness of 0.5–3.0 μm. In the layer of copper nitride, nitrogen atom may be uniformly distributed or appropriately localized. In the present invention, nitrogen atom may preferably be localized in the vicinity of a boundary between the principal electroconductive layer 12 and the adhesive layer 11 in order to improve an adhesiveness without lowering a resistivity of the principal electroconductive layer 12.

The protective layer 13 may preferably comprise a material of a metal or alloy selected from the group consisting of Cu, Ni, Mo, Cr, W, Ta and Ag. The protective layer 13 may preferably have a thickness of 0.01–0.3 μm in order to prevent surface oxidation of Cu (principal electroconductive layer 12). In the case where the polymeric material layer 4 is not used, the protective layer 13 may preferably be formed so as to coat an entire exposed surface of the principal electroconductive layer 12. When the protective layer 13 comprises a layer of metal nitride, it is possible to increase a surface roughness of the metal electrodes 3, thus enhancing an electrical conduction with the transparent electrodes 5 while obviating an adverse influence of a resin component (of, e.g., the polymeric material 4) remaining on the metal electrodes 3.

The mixing layer 14 may preferably comprise materials for the adhesive layer 11 and principal electroconductive layer 12 and may include a layer of metal nitride. The mixing layer 14 may preferably have a thickness of 0.005–0.3 μm.

The above-mentioned layers 11–14 constituting each metal electrode 3 may generally be formed by sputtering. In this instance, the mixing layer 14 may generally be formed by co-sputtering (simultaneous sputtering) with materials for the adhesive layer 11 and principal electroconductive layer 12.

In the present invention, the layer of metal nitride may have a uniform nitrogen atom distribution or a nitrogen atom distribution such that the nitrogen content (atomic percent= at %) is gradually changed.

In forming the layer of metal nitride, the nitrogen content (at %) may appropriately be controlled by changing a flow rate of nitrogen gas in a sputtering process. The nitrogen content varies depending on a layer structure or materials therefor but may generally be 0.1–50 at %, preferably 0.1–10 at %. Above 50 at %, a resultant layer is liable to be lowered in strength.

Figure 6:
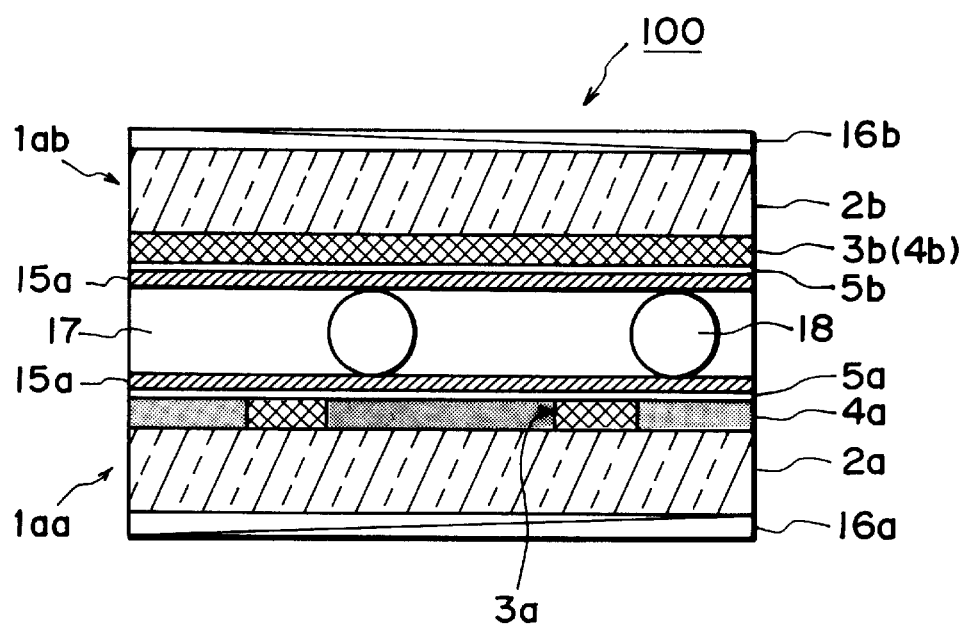
FIG. 6 is a schematic sectional view of an embodiment of a liquid crystal device including an electrode plate according to the present invention.

FIG. 6 shows an embodiment of the liquid crystal device according to the present invention.

Referring to FIG. 6, a liquid crystal device 100 includes a pair of electrode plates 1aa and 1ab disposed opposite to each other with a prescribed cell gap (e.g., 1.0–2.5 μm), which is filled with a liquid crystal 17 (preferably a chiral smectic liquid crystal) together with spacer beads 18 (e.g., silica or alumina beads) and a sealing agent (not shown). Outside the electrode plates 1aa and 1ab, a pair of polarizers 16a and 16b are disposed, e.g., in case nicols.

Each electrode plate 1aa (1ab) may have a similar structure as in the electrode plates 1a–1e as shown in FIGS. 1–5. Specifically, each electrode plate 1aa (1ab) comprise a glass substrate 2a (2b), a plurality of metal electrodes 3a (3b) disposed on the glass substrate 2a (2b) with spacings, an insulating layer of a UV-cured resin 4a (4b) disposed at the spacings, and a plurality of transparent electrodes 5a (5b) of ITO disposed on the metal electrodes 3a (3b) and the UV-cured resin layer 4a (4b) so that each transparent electrode 5a (5b) is electrically connected with an associated metal electrode 3a (3b).

Each metal electrode 3a (3b) include a layer of metal nitride as described above.

In the present invention, only one of the electrode plates 1aa and 1ab having a structure shown in FIGS. 1–5 (according to the present invention) may be used as a plate for constituting a liquid crystal device. In such a case, the other plate may have a structure free from electrodes.

On the transparent electrodes 5a (5b), an alignment control layer 15a (15b) of, e.g., polyimide, polyamide or polysiloxane, is formed. The alignment control layers 15a and 15b may comprise an identical material or different materials, and one of which may preferably be subjected to a uniaxial aligning treatment such as rubbing.

The transparent electrodes 5a and 5b (and the metal electrodes 3a (3b)) intersect with each other at right angles to form an electrode matrix.

Hereinbelow, the present invention will be described more specifically based on Examples.

EXAMPLE 1

In this example, a liquid crystal device including an electrode plate 1a as shown in FIG. 1 was prepared through the steps shown in FIGS. 7A–9E in the following manner.

Figure 7A:
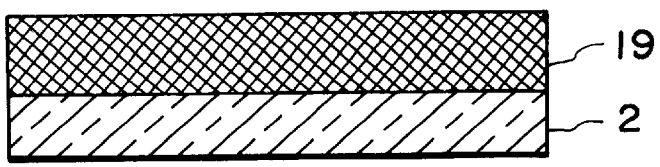
FIGS. 7A–7D, 8A–8E and 9A–9E are schematic sectional views for illustrating a series of steps generally involved in an embodiment of a process for producing an electrode plate according to the present invention.

Seven substrates A1–G1 including a copper layer or copper nitride layers having different nitrogen content shown in Table 1 below were each prepared by forming a 1 $\mu$m-thick metal (copper or copper nitride) layer 19 on a 1.1 mm-thick glass substrate 2 (300×340 mm) by sputtering (FIG. 7A).

The sputtering was performed under the following conditions:

Substrate temperature: 300° C.
Pressure: 5 mtorr
Argon gas flow rate: 100 sccm (fixed)
Nitrogen gas flow rate: 0, 1, 5, 10, 12, 15, 20 sccm The thus-prepared substrates A1–G1 were subjected to a measurement of a volume resistivity (Rv), a measurement of a stress, a tape peeling test, and a measurement of nitrogen content in the following manner.

Volume Resistivity (RV)

A volume resistivity was measured according to a four point probe method. More specifically, a current was caused to pass through a sample metal layer in its longitudinal direction by using a constant-current supply. Thereafter, a voltage between two points through which the current passes was measured to obtain a volume resistivity (ohm.cm). The measurement was performed at 22° C. and 45% RH.

Stress

A sample glass substrate before and after the formation of the metal layer was subjected to measurement of interference fringes thereon by using Fizeau Interferomer ("MARK III", mfd. by Zygo Co.) to obtain a radius of curvature R (degree of bow) of the distorted substrate due to stress within the metal layer.

A stress $\sigma$ (N/m$^2$) was obtained according to G. G. Stoney equation shown below:

$$\sigma = E \cdot D^2 / (6 \cdot (1-u) \cdot d \cdot R),$$

wherein E represented a Young's modulus (N/m$^2$) of the substrate, D represented a thickness (m) of the substrate, u represented a Poisson ratio of the substrate, and R represented the above-mentioned radius of curvature (m).

Tape Peeling Test

A sample metal layer on a glass substrate was scribed or partially cut by a cutter in such a manner that a prescribed region (20×25 mm) of the sample metal layer was divided into 20 square portions or pieces each having a size of 5 mm×5 mm.

Then, a cellophane tape (mfd. by Nichiban K. K.) was attached to the above region and peeled vertically therefrom. Thereafter, the number of peeled portions from the region (piece(s)/20 pieces) was counted.

Nitrogen Content

A nitrogen content (at %) in a sample layer was determined by using a wavelength dispersion-type X-ray microanalyzer (WDX).

The results are shown in Table 1.

TABLE 1

| Substrate | A1 | B1 | C1 | D1 | E1 | F1 | G1 |
|---|---|---|---|---|---|---|---|
| N$_2$ gas flow rate (SCCM) | 0 | 1 | 5 | 10 | 12 | 15 | 20 |
| Rv (×10$^{-6}$ ohm.cm) | 2.1 | 2.1 | 2.1 | 2.1 | 2.3 | 3.9 | 12 |
| Stress (×10$^8$ N/m$^2$) | 2.9 | 2.9 | 2.9 | 2.8 | 1.2 | 0.2 | 0.1 |
| Number of peeled portion (pieces(s)/20 pieces) | 20 | 6 | 3 | 2 | 2 | 20 | 20 |
| N content (at %) | 0 | 0.1 | 1.0 | 2.5 | 10 | 12 | 20 |

An apparent from Table 1, the substrates B1–E1 including the copper nitride layers 19 having an N content of 0.1–10 at % were found to provide a better adhesive property with the glass substrate 2 and provided a volume resistivity Rv substantially identical to that of the copper layer 19 (containing no nitrogen) of the substrate A1. With respect to the stress, the substrates E1, F1 and G1 (N content: 10–20 at %) showed decreased stress values. This may be attributable to improvement in an adhesiveness between the copper nitride layers 19 and the glass substrate 2. However, the substrates F1 and G1 (N content: 12 and 20 at %) caused peeling of all the square portions (20 pieces/20 pieces) in fragments due to a decrease in strength of the copper nitride layers 19.

Figure 7B:
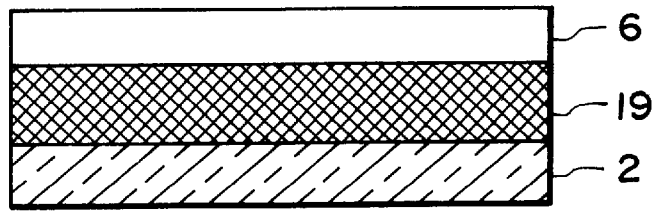
Figure 7C:
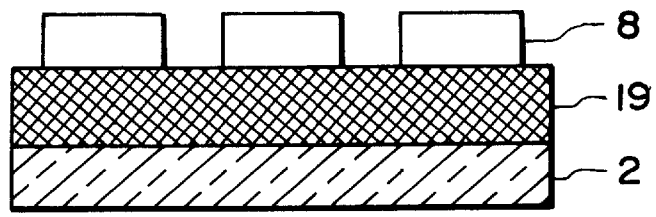

Then, each of the substrates B1–E1 (N content: 0.1–10 at %) was coated with a 2 $\mu$m-thick photoresist 6 ("OFPR-800", mfd. by Tokyo Ohka Kogyo K.K.) by spin coating, followed by exposure to light via a photomask 7 having a prescribed pattern and development and post-baking of the photoresist 6 to form an etching pattern 8 (FIGS. 7B and 7C).

Figure 7D:
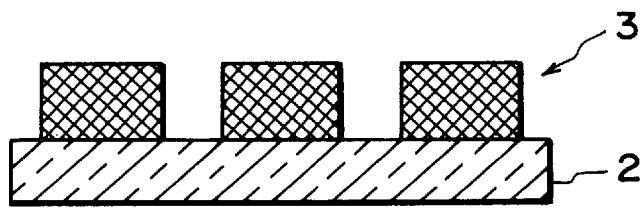

Thereafter, the copper nitride layer 19 formed on the glass substrate 2 was etched with an etchant (FeCl$_3$ solution), followed by removal of the etching pattern 8 to form a plurality of metal electrodes 3 of copper nitride in a stripe shape (width=8 $\mu$m, pitch=320 $\mu$m) (FIG. 7D).

Figure 8A:
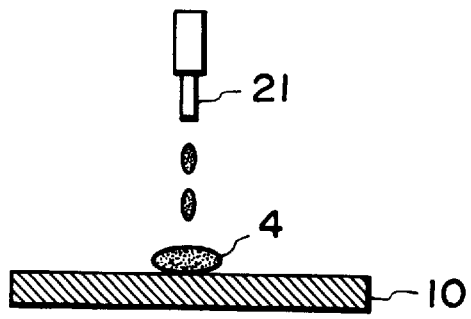
Figure 8B:
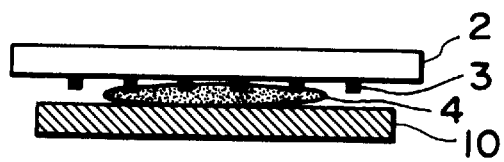

On a smooth or smoothing plate 10, a prescribed amount of a UV-curable resin 4 was placed dropwise by using a dispenser 21 (FIG. 8A). On the resultant smooth plate 10, the glass substrate 2 having thereon the striped metal electrodes 3 was superposed so as to sandwich the UV-curable resin therebetween (FIG. 8B) to provide a laminated structure.

Figure 8C:
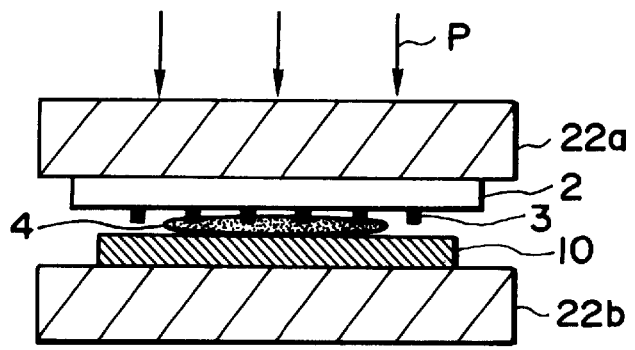

The laminated structure (of the structural members 2, 3, 4 and 10) was supplied with a pressure P by using a press including a pair of pressing plates 22a and 22b to cause an intimate contact over the entire area of the laminated structure (FIG. 8C). At this time, the smooth plate 10 and the glass substrate 2 were strongly and uniformly pressed by the press so as to remove the UV-curable resin 4 from the surface of the metal electrodes 3 to the extent that no or a very small amount of the resin remained on the metal electrode surface.

Figure 8D:
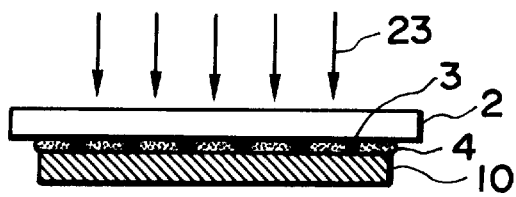

Thereafter, the laminated structure was taken out from the press (pair of pressing plates 22a and 22b) was irradiated for 2 min. with UV rays 23 (issued from four 100 W—high pressure mercury lamps disposed outside the glass substrate 2) to cure the UV-curable resin 4 (FIG. 8D).

Figure 8E:

Then, the laminated structure excluding the smooth plate 10 was removed by using a releasing mechanism (not shown) to obtain a structure having a flattened surface formed by the metal electrodes 3 and the UV-cured resin 4 filling the spacings between the metal electrodes 3 on the glass substrate 2 (FIG. 8E).

The thus-obtained structure (as shown in FIG. 8E) wherein the (upper) surface of the metal electrodes 3 was exposed was subjected to an oxidation test for 500 hours under a temperature of 60° C. and a relative humidity of 90% to observe a change in color. As a result, all the structures using the substrates B1–E1 (N content: 0.1–10 at %) did not cause oxidation of their meal electrodes 3 at the upper (exposed) surface and side surfaces contacting the UV-cured resin 4.

Figure 9A:
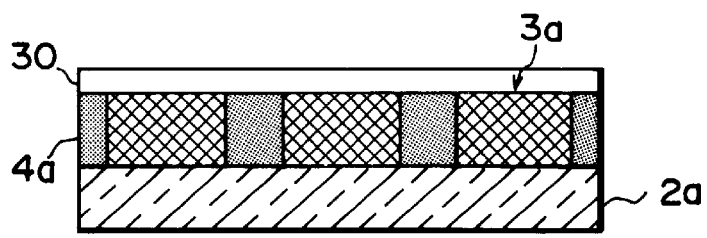

Then, each of the above structures (including the glass substrate 2a, the metal electrodes 3a and the UV-cured resin 4a) was further coated with a 700 Å-thick ITO layer 30 by sputtering (FIG. 9A).

Figure 9B:
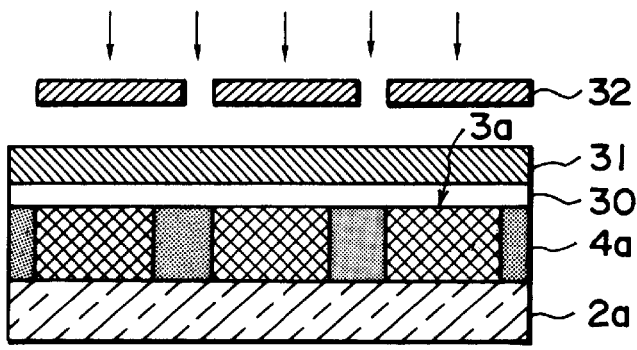
Figure 9C:
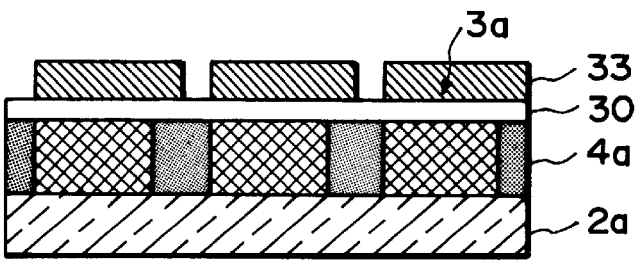

On the ITO layer 30, a 2 μm-thick photoresist 31 was formed by spin coating, followed by exposure to light via a photomask 32 having a prescribed pattern and development and post-baking of the photoresist 31 to form an etching pattern 33 on the ITO layer 30 (FIGS. 9B and 9C).

Figure 9D:
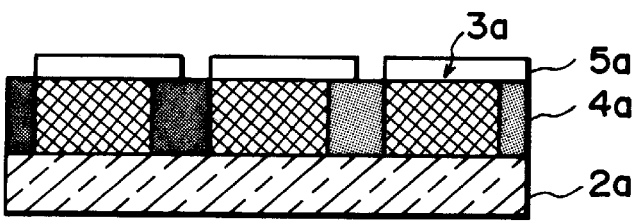
Figure 9E:
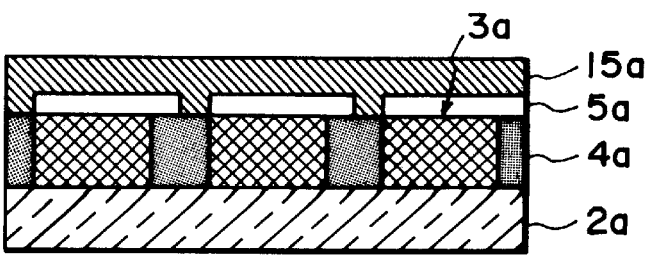

The thus-formed structure was then immersed in an etchant (hydroiodic acid) to etch the uncovered portion (surface) of the ITO layer 30, followed by removal of the etching pattern 3 to form a plurality of transparent electrodes 5a of ITo in a stripe pattern (width=300 μm) (FIG. 9D).

The transparent electrodes 5a were spin-coated at 2000 rpm for 20 sec. with a 1.5 wt. %-solution of polyamic acid ("LQ1800", mfd. by Hitachi Kasei Kogyo K.K.) in an N-methylpyrrolidone/n-butyl cellosolve (=1/1), followed by hot baking at 270° C. for 1 hour to form a 200 Å-thick alignment control film 15a, which was then subjected to rubbing to prepare an electrode plate (FIG. 9E) (i.e., electrode plate 1aa as shown in FIG. 6).

The other electrode plate 1ab as shown in FIG. 6 was prepared in the same manner described above.

On the surface of the electrode plate 1aa, spacer beads 18 (as shown in FIG. 6) were dispersed. On the periphery of the other electrode plate 1ab, a sealing agent of epoxy resin was applied by flexography. The thus-treated electrode plates 1aa and 1ab were applied to each other with a cell gap of 1.5 μm so that their rubbed directions were parallel and identical to each other. Into the cell gap, a chiral smectic liquid crystal 17 was filled to prepare a liquid crystal device 100 as shown in FIG. 6.

In this example, by forming the metal electrodes 3 with copper nitride having N content of 0.1–10 at %, it was possible to improve an adhesiveness between the metal electrodes 3 and the glass substrate 2 and to prevent the surface oxidation of the metal electrodes 3 through the formation of a passivation film while retaining the lower volume resistivity of the metal electrodes 3.

EXAMPLE 2

In this example, an electrode plate 1d as shown in FIG. 4 including an adhesive layer 11, a principal electroconductive layer 12 and a protective layer 13 was prepared in the following manner and evaluated in the same manner as in Example 1.

Seven substrates A2–G2 were prepared in the same manner as in Example 1 except that a 500 Å-thick adhesive layer 11 of copper nitride, a 1 μm-thick principal electroconductive layer 12 of copper and a 1000 Å-thick protective layer 13 of copper nitride were formed by sputtering in this order on a 1.1 mm-thick glass substrate 2 (300×340 mm).

The sputtering was performed under the following conditions:

<for the copper nitride layers 11 and 13>

Substrate temperature: 300° C.

Pressure: 5 mtorr

Ar gas flow rate: 100 sccm (fixed)

$N_2$ gas flow rate: 0, 7, 10, 20, 50, 60, 70 sccm

<for the copper layer 12>

Substrate temperature: 300° C.

Pressure: 5 mtorr

Ar gas flow rate: 100 sccm

The evaluation results are shown in Table 2.

TABLE 2

| Substrate | A2 | B2 | C2 | D2 | E2 | F2 | G2 |
|---|---|---|---|---|---|---|---|
| $N_2$ gas flow rate (SCCM) | 0 | 7 | 10 | 20 | 50 | 60 | 70 |
| Rv (× $10^{-6}$ ohm · cm) | 2.1 | 2.1 | 2.1 | 2.3 | 11 | 112 | 320 |
| Number of peeled portion (pieces(s)/20 pieces) | 20 | 3 | 2 | 2 | 1 | 20 | 20 |
| N content (at %) | 0 | 5 | 10 | 20 | 40 | 50 | 60 |

As apparent from the above results, the substrates B2–E2 (N content: 5–40 at %) provided a better adhesive property with the glass substrate 2 and the substrates B2, C2 and D2 provided a volume resistivity Rv substantially identical to that of the substrate A2 (N content: 0 at %).

Then, structures using the substrates B2–E2 for the oxidation test were each prepared in the same manner as in Example 1 and were each subjected to the oxidation test in the same manner as in Example 1, whereby all the structures using the substrates B2–E2 did not cause oxidation of the metal electrodes 3 at their entire surfaces.

In this example, by providing the metal electrodes 3 with three-layer structure including the adhesive layer 11 and protective layer 13 each having an N content of 5–40 at % and sandwiching therein the principal electroconductive layer 12, it was possible to improve an adhesiveness with the glass substrate 2 and a resistance to oxidation of the metal electrode 3.

EXAMPLE 3

In this example, an electrode plate 1d as shown in FIG. 4 including a gradually nitrided layer 11, a principal electroconductive layer 12 and a gradually nitrided layer 13 was prepared in the following manner and evaluated in the same manner as in Example 1.

Seven substrates A3–G3 were prepared in the same manner as in Example 1 except that a 1500 Å-thick layer 11 of copper gradually nitrided, a 7000 Å-thick principal electroconductive layer 12 of copper and a 1500 Å-thick layer 13 of copper gradually nitrided were formed by sputtering in this order on a 1.1 mm-thick glass substrate 2 (300×340 mm).

The sputtering was performed under the following conditions:

<for the gradually nitrided copper layers 11 and 13>

Substrate temperature: 300° C.

Pressure: 5 mtorr

Ar gas flow rate: 100 sccm (fixed)

$N_2$ gas flow rate (maximum): 0, 3, 7, 10, 20, 30, 50 sccm

Time: 200 sec.

<for the copper layer 12>

Substrate temperature: 300° C.

Pressure: 5 mtorr

Ar gas flow rate: 100 sccm

Time: 1000 sec.

More specifically, e.g., with respect to the substrate E3 (N content: 20 at %), the gradually nitrided copper layer 11 was formed on the glass substrate 2 by decreasing an $N_2$ gas flow rate from 20 sccm to 0 sccm in 200 sec. according to a mass-flow program control. Thereafter, at the $N_2$ gas flow rate of 0 sccm, the copper layer 12 was formed thereon by sputtering for 1000 sec. On the copper layer 12, the gradually nitrided copper layer 13 was formed by increasing the $N_2$ gas flow rate from 0 sccm to 20 sccm in 200 sec.

The evaluation results are shown in Table 3.

TABLE 3

| Substrate | A3 | B3 | C3 | D3 | E3 | F3 | G3 |
|---|---|---|---|---|---|---|---|
| Maximum $N_2$ gas flow rate | 0 | 3 | 7 | 10 | 20 | 30 | 50 |
| Rv ($\times 10^{-6}$ ohm · cm) | 2.1 | 2.1 | 2.1 | 2.1 | 2.2 | 3.8 | 12 |
| Number of peeled portion (pieces(s)/ 20 pieces) | 20 | 4 | 3 | 3 | 2 | 4 | 20 |
| N content*1 (at %) | 0 | 2 | 5 | 10 | 20 | 30 | 40 |

(*1): Measured in the vicinity of the boundary with the glass substrate 2 according to SIMS (secondary ion mass spectrometry).

As apparent from the above results, the substrates B3–E3 (N content: 2–30 at %) provided a better adhesive property with the glass substrate 2.

Then, structures using the substrates B3–F3 for the oxidation test were each prepared in the same manner as in Example 1 and were each subjected to the oxidation test in the same manner as in Example 1, whereby all the structures using the substrates B3–F3 did not cause oxidation of the metal electrodes 3 at their entire surfaces.

In this example, by providing the metal electrodes 3 with three-layer structure including the gradually nitrided layers 11 and 13 each having an N content of 2–30 at % and sandwiching therein the principal electroconductive layer 12, it was possible to improve an adhesiveness with the glass substrate 2 and a resistance to oxidation of the metal electrode 3.

EXAMPLE 4

In this example, an electrode plate 1d as shown in FIG. 4 including an adhesive layer 11, a principal electroconductive layer 12 and a protective layer 13 was prepared in the following manner and evaluated in the same manner as in Example 1.

Seven substrates A4–G4 were prepared in the same manner as in Example 1 except that a 300 Å-thick adhesive layer 11 of molybdenum nitride, a 2 μm-thick principal electroconductive layer 12 of copper nitride and a 300 Å-thick protective layer 13 of molybdenum were formed by sputtering in this order on a 1.1 mm-thick glass substrate 2 (300×340 mm).

The sputtering was performed under the following conditions:

<for the molybdenum layers 11 and 13>

Substrate temperature: 300° C.

Pressure: 5 mtorr

Ar gas flow rate: 100 sccm

<for the copper nitride layer 12>

Substrate temperature: 300° C.

Pressure: 5 mtorr

Ar gas flow rate: 100 sccm (fixed)

$N_2$ gas flow rate: 0, 5, 10, 20, 50, 60, 70 sccm

The evaluation results are shown in Table 4.

TABLE 4

| Substrate | A4 | B4 | C4 | D4 | E4 | F4 | G4 |
|---|---|---|---|---|---|---|---|
| $N_2$ gas flow rate (SCCM) | 0 | 5 | 10 | 20 | 50 | 60 | 70 |
| Rv*2 ($\times 10^{-6}$ ohm · cm) | 2.1 | 2.1 | 2.1 | 2.1 | 2.2 | 2.8 | 4.2 |
| Number of peeled portion (pieces(s)/ 20 pieces) | 2 | 0 | 0 | 0 | 0 | 10 | 20 |
| N content *1 (at %) | 0 | 5 | 10 | 20 | 40 | 50 | 60 |

(*2): These values were measured with respect to the copper nitride layer 12 after removal of the protective (molybdenum) layer 13 by etching with an etchant ($HCl/HNO_3/CH_2COOH/H_2O$ = 1/1/0.5/5 by volume).

As apparent from the above results, by the use of the adhesive layer 11 of molybdenum, the substrates A4–E4 (N content: 0–40 at %) were found to improve an adhesiveness with the glass substrate 2. In this regard, 2 peeled portions were observed in the substrate A4. This may be attributable to a larger stress of the copper layer 12 (N content: 0 at %) resulting from the relatively larger thickness of 2 pm. Further, the substrates B4–E4 (N content: 5–40 at %) provided a volume resistivity Rv substantially identical to that of the copper layer 12 of the substrate A4.

Then, structures using the substrates B4–E4 for the oxidation test were each prepared in the same manner as in Example 1 except that an etchant ($HCl/HNO_3/CH_2COOH/H_2O$=1/1/0.5/5 by volume) was used for the molybdenum layers 11 and 13 and were each subjected to the oxidation test in the same manner as in Example 1, whereby all the structures using the substrates B4–E4 did not cause oxidation of the metal electrodes 3 at their entire surfaces.

In this example, by providing the metal electrodes 3 with three-layer structure including the molybdenum layers 11 and 13 and the copper nitride layer 12 having an N content of 5–40 at %, it was possible to improve an adhesiveness with the glass substrate 2 and a resistance to oxidation of the metal electrode 3.

EXAMPLE 5

In this example, an electrode plate 1d as shown in FIG. 4 including an adhesive layer 11, a principal electroconductive layer 12 and a protective layer 13 was prepared in the following manner and evaluated in the same manner as in Example 1.

Seven substrates A5–G5 were prenared in the same manner as in Example 1 except that a 300 Å-thick adhesive layer 11 of nickel nitride, a 2 μm-thick principal electroconductive layer 12 of copper and a 300 Å-thick protective layer 13 of nickel nitride were formed by sputtering in this order on a 1.1 mm-thick glass substrate 2 (300×340 mm).

The sputtering was performed under the following conditions:

Substrate temperature: 300° C.
Pressure: 5 mtorr
Ar gas flow rate: 100 sccm (fixed)
$N_2$ gas flow rate: 0, 5, 10, 20, 50, 60, 70 sccm The evaluation results are shown in Table 5.

TABLE 5

| Substrate | A5 | B5 | C5 | D5 | E5 | F5 | G5 |
|---|---|---|---|---|---|---|---|
| $N_2$ gas flow rate | 0 | 5 | 10 | 20 | 50 | 60 | 70 |
| Rv*[3] ($\times 10^{-6}$ ohm · cm) | 2.1 | 2.1 | 2.1 | 2.1 | 2.2 | 4.0 | 6.8 |
| Number of peeled portion (pieces(s)/20 pieces) | 2 | 0 | 0 | 0 | 0 | 8 | 20 |
| N content*[3] (at %) | 0 | 5 | 8 | 24 | 40 | 50 | 60 |

(*3): These values were measured with respect to the copper nitride layer 12 after removal of the protective (nickel) layer 13 by etching with an etchant (FeCl₃ solution).

As apparent from the above results, the substrates B5–E5 (N content: 5–40 at %) provided a better adhesive property with (i.e., no peeled portion from) the glass substrate 2 and provided a volume resistivity Rv substantially identical to that of the copper layer 12 of the substrate A5 (N content: 0 at %).

Then, structures using the substrates B5–E5 for the oxidation test were each prepared in the same manner as in Example 1 and were each subjected to the oxidation test in the same manner as in Example 1, whereby all the structures using the substrates B5–E5 did not cause oxidation of the metal electrodes 3 at their entire surfaces.

In this example, by providing the metal electrodes 3 with three-layer structure including the nickel nitride layers 11 and 13 and the copper nitride layer 12 each having an N content of 5–40 at %, it was possible to improve an adhesiveness with the glass substrate 2 and a resistance to oxidation of the metal electrode 3.

EXAMPLE 6

Figure 2:
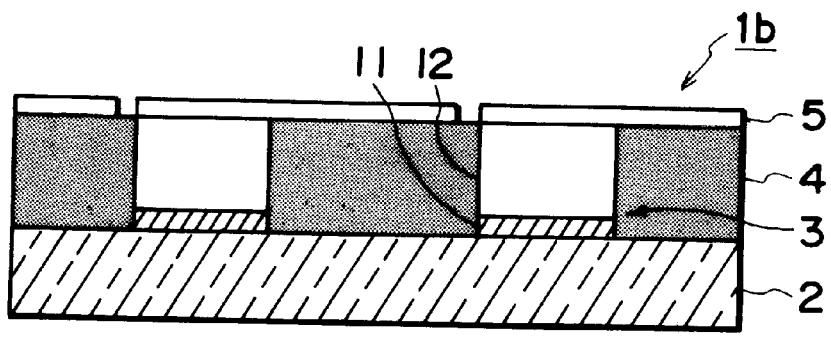

In this example, an electrode plate 1b as shown in FIG. 2 including an adhesive layer 11 and a principal electroconductive layer 12 was prepared in the following manner and evaluated in the same manner as in Example 1.

A substrate A6 was prepared in the following manner.

A 300 Å-thick adhesive layer 11 of nickel-molybdenum alloy (Mo: 15%) and a 1 μm-thick principal electroconductive layer 12 of copper were formed by sputtering in this order on a 1.1 mm-thick glass substrate 2 (300×340 mm).

The sputtering was performed under the following conditions:

Substrate temperature: 300° C.
Pressure: 5 mtorr
Ar gas flow rate: 100 sccm

The glass substrate 2 having thereon the nickel-molybdenum alloy layer 11 and the copper layer 12 was then subjected to annealing in a nitrogen-atmospheric chamber under the following conditions:

Annealing temperature: 300° C.
$N_2$ gas pressure: 10 torr
Annealing time: 3 hour The thus prepared substrate A6 was analyzed by secondary ion mass spectrometry (SIMS), whereby the substrate A6 was found to have a 2000 Å-thick (deep) copper nitride portion from the surface of the copper layer 12.

Further, the substrate A6 provided no peeled portion in the tape peeling test and also provided a volume resistivity Rv of $6.2\times10^{-6}$ ohm.cm and N content of 25 at % in the vicinity of the surface thereof.

The volume resistivity Rv was lowered to $2.1\times10^{-6}$ ohm.cm when the 2000 Å-thick copper nitride portion was removed by etching (etchant: FeCl₃).

Further, the entire metal electrodes 3 of the substrate A6 showed a volume resistivity Rv of $2.1\times10^{-6}$ ohm.cm.

Then, a structure using the substrate A6 for the oxidation test was prepared in the same manner as in Example 1 and were each subjected to the oxidation test in the same manner as in Example 1, whereby the structure using the substrate A6 did not cause oxidation of the metal electrodes 3 at their entire surfaces.

In this example, by providing the metal electrodes 3 with two-layer structure including the Ni—Mo alloy layer 11 and the copper layer 12 including the copper nitride portion having an N content of 25 at %, it was possible to improve an adhesiveness with the glass substrate 2 and a resistance to oxidation of the metal electrode 3.

EXAMPLE 7

Figure 3:
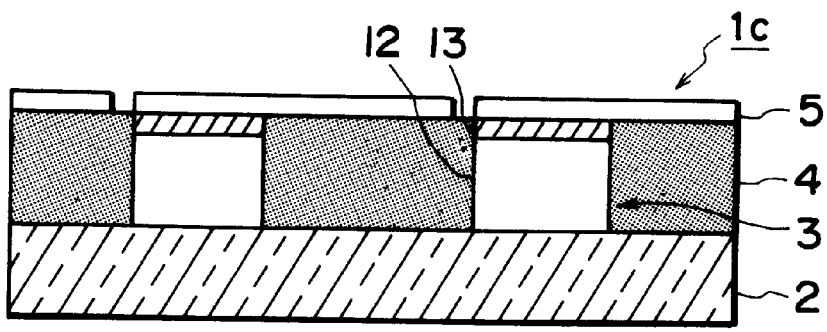

In this example, an electrode plate 1c as shown in FIG. 3 including, a principal electroconductive layer 12 and a protective layer 13 was prepared in the following manner and evaluated in the same manner as in Example 1.

Seven substrates A7–G7 were prepared in the same manner as in Example 1 except that a 1 μm-thick principal electroconductive layer 12 of copper and a 300 Å-thick protective layer 13 of molybdenum nitride were formed by sputtering in this order on a 1.1 mm-thick glass substrate 2 (300×340 mm).

The sputtering was performed under the following conditions:

<for the copper layer 12>

Substrate temperature: 200° C.
Pressure: 3 mtorr
Power: 7 kW
Ar gas flow rate: 100 sccm
Time: 12 min.

<for the molybdenum nitride layer 13>

Substrate temperature: 200° C.
Pressure: 3 mtorr
Power: 7 kW
Ar gas flow rate: 100 sccm
$N_2$ gas flow rate: Controlled (e.g., 3 sccm for providing N content of 1.2 at %)
Time: 12 min.

The evaluation results are shown in Table 6.

TABLE 6

| Substrate | A7 | B7 | C7 | D7 | E7 | F7 | G7 |
|---|---|---|---|---|---|---|---|
| N content*[4] (at %) | 0 | 1.2 | 5 | 10 | 30 | 50 | 60 |
| Surface roughness*[5] (Å) | 50 | 500 | 600 | 1000 | 1000 | 1000 | 1000 |
| Rv ($\times 10^{-6}$ ohm · cm) | 2.1 | 2.1 | 2.1 | 2.1 | 2.1 | 2.1 | 2.1 |

(*4): measured according to WDX roughness meter.
(*5): measured by using a surface roughness meter ("ALPHA STEP 500", mfd. by TENCOR INSTRUMENT Co.).

Then, structures using the substrates A7–G7 for the oxidation test were each prepared in the same manner as in Example 1 except that etching of the molybdenum nitride layer 13 was performed by using a mixture etchant of 300 g of $K_3[Fe(CN)_6]$, 50 g of NaOH and 1 liter of water ($H_2O$), followed by washing with HCl of oxidation film formed at the exposed surface of the copper layer 12 and by etching of the copper layer 12 with a 20%-$CuCl_3$ solution to form stripe-shaped metal electrodes 3 each having a width of 18 μm and a pitch of 320 μm.

These structures using the substrates A7–G7 were subjected to the oxidation test in the same manner as in Example 1, whereby the structures using the substrates B7–G7 (N content: 1.2–60 at %) did not cause oxidation of the metal electrodes 3 at their entire surfaces but the structure using the substrate A7 (N content: 0 at %) caused oxidation of the metal electrode surface confirmed by a change in color thereof.

Then, a structure using a substrate A7a identical to that using the substrate A7 (N content: 0 at %) except that the substrate temperature (200° C. for the substrate A7) in sputtering was changed to 450° C.

The structures using the substrate A7–G7 and A7a were each coated with a plurality of 700 Å-thick transparent electrodes of ITO patterned in a stripe shape (width=20 μm, pitch=320 μm) to form sample electrode plates for an electrical conduction test.

The electrical conduction test was performed in the following manner.

According to the four point probe method described above, a current was caused to pass through an electrode (transparent electrode width=20 μm, metal electrode width=18 μm, length=30 cm). At this time, a voltage between a base point and a varying point was measured to determine an electrical resistance of the electrode.

Figure 10:
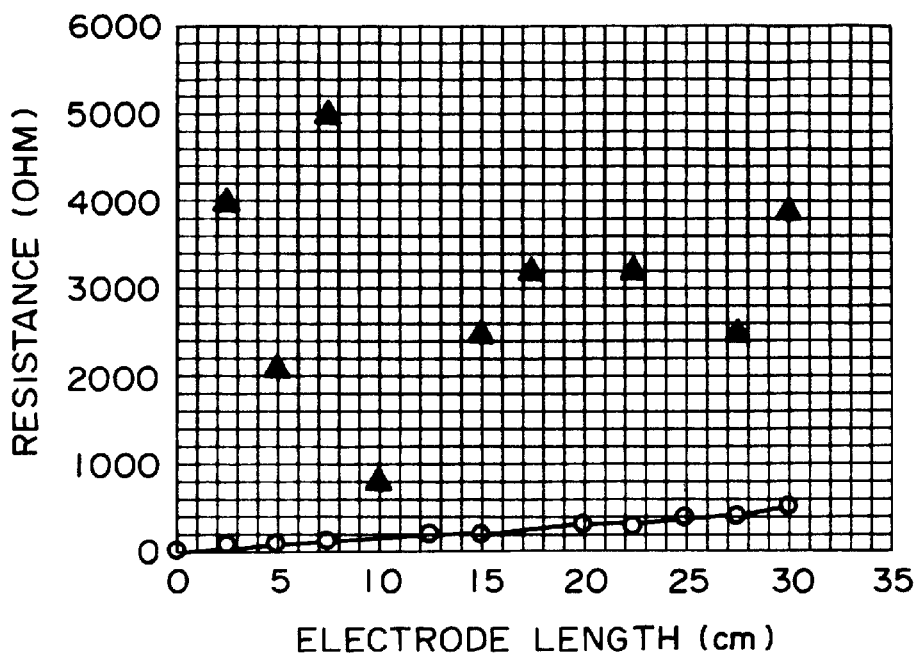
FIGS. 10–12 are graphs each showing a relationship between electrode length and an electrical resistance with respect to an electrode structure including a layer of metal nitride used in the electrode plate according to the present invention and a conventional electrode structure including a metal layer free from nitrogen.

The results are shown in FIG. 10.

In FIG. 10, the abscissa represented an electrode length corresponding to a distance (cm) between the base and varying points and the ordinate represented an electrical resistance (ohm) for each electrode length.

In FIG. 10, the black triangular dots (▲) represented values for the electrode plates using the substrate A7 (N content: 0 at %, substrate temp. (in sputtering): 200° C.) and the circular dots (○) represented values for the electrode plates using the substrate B7–G7 (N content: 1.2–60 at %, substrate temp.: 200° C.) and the substrate A7a (N content: 0 at %, substrate temp.: 450° C.).

As apparent from the results shown in FIG. 10, the resistance values (○) for the electrode plates using the substrates B7–G7 according to the present invention were directly proportional to the electrode length (distance between the base and varying points). In this regard, when the electrode length of 30 cm, the resistance was ca. 500 ohm. which closer to the calculated value. Accordingly, the electrode plates (using the substrates B7–G7) of the present invention were found to provide a good electrical connection state between the metal electrodes and the transparent electrodes.

On the other hand, the electrode plate using the substrate A7 (N content: 0 at %) failed to provide a proportional relationship between the electrode length and the resistance and showed irregular values varying from ca. 800–5000 ohm. Accordingly, the electrode plate using the substrate A7 was found to fail to provide a good electrical conduction between the metal and transparent electrodes.

The electrode plate using the substrate A7a (N content: 0 at %) provided the proportional relationship between the electrode length and the resistance similarly as in the electrode plate according to the present invention. However, the electrode plate using the substrate A7a is liable to cause a problem such that a color filter and/or a resinous light-interrupting layer (so-called black matrix) are deteriorated or damaged at high temperature (400° C.) in its sputtering process. Incidentally, the metal electrodes of the substrate A7a provided a surface roughness of 400 Å.

When the electrical conduction test was performed with respect to an electrode plate using a substrates provided with metal electrodes doped with nitrogen and having a surface roughness of 100 Å, the electrode plate using such a substrate also provided the proportional relationship between the electrode length and the resistance as represented by the circular dots (○) in FIG. 10.

In this example, by providing the metal electrodes 3 with two-layer structure including the molybdenum nitride (protective) layer 13 having an N content of 1.2–60 at % and the copper (principal electroconductive) layer 12, it was possible to improve an adhesiveness with the glass substrate 2 and a resistance to oxidation of the metal electrode 3.

Further, it is also possible to avoid an adverse influence on a color filter and a black matrix at the time of sputtering even if such structural members are used since the sputtering (formation of the metal electrodes) can be performed at a relatively lower temperature (200° C.).

EXAMPLE 8

In this example, an electrode plate 1d as shown in FIG. 3 including, a principal electroconductive layer 12 and a protective layer 13 was prepared in the following manner and evaluated in the same manner as in Example 7.

Two substrates A8 and B8 were prepared in the same manner as in Example 7 except that, a 9500 Å-thick principal electroconductive layer 12 of copper and a 500 Å-thick protective layer 13 of copper nitride were formed by sputtering in this order on a 1.1 mm-thick glass substrate 2 (300×340 mm).

The sputtering was performed under the following conditions:

<for the copper layer 12>

Substrate temperature: 200° C.

Pressure: 3 mtorr

Power: 7 kW

Ar gas flow rate: 100 sccm

Time: 11.5 min.

<for the copper nitride layer 13>

Substrate temperature: 200° C.

Pressure: 5 mtorr

Power: 7 kV

Ar gas flow rate: 100 sccm $N_2$ gas flow rate: 0, 3 sccm

Time: 30 sec.

Figure 11:
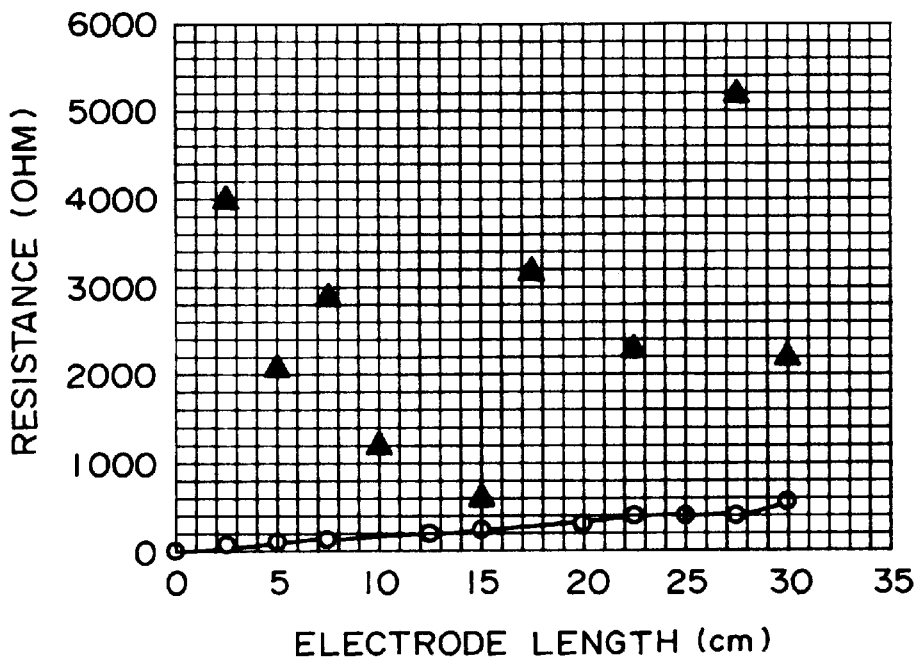

The evaluation results are shown in Table 7 and FIG. 11.

TABLE 7

| Substrate | A8 | B8 |
| --- | --- | --- |
| N content*4 (at %) | 0 | 1.7 |
| Surface roughness*5 (Å) | 50 | 400 |

(*4) (*5): the same as in Table 6.

In this example, the patterning of the metal electrodes was performed by using an etchant of a 9%-$FeCl_3$ solution.

FIG. 11 shows a result of the electrical conduction test with respect to electrode plates using the substrates A8 and B8 wherein the triangular dots (▲) represent the values for the electrode plate using the substrate A8 and the circular dots (○) represent the values for the electrode plate using the substrate B8.

As apparent from FIG. 11, the electrode plate using the substrate B8 (N content: 1.7 at %) according to the present invention was found to provide a good electrical conduction state between the transparent and metal electrodes, whereas the electrode plate using the substrate A8 (N content: 0 at %) was found not to provide the good electrical conduction state.

When the electrical conduction test was performed with respect to electrode plates using substrates provided with metal electrodes doped with nitrogen and having a surface roughness of 100–600 Å, the electrode plates using such substrates also provided the good electrical conduction state.

Further, as a result of the oxidation test for the substrates A8 and B8, the substrate B8 (N content: 1.7 at %) did not cause oxidation of the metal electrodes but the substrate A8 (N content: 0 at %) caused oxidation.

In this example, similarly as in Example 7, it was possible to improve an adhesiveness with the glass substrate 2 and a resistance to oxidation of the metal electrodes 3. Further, it is possible to prevent a deterioration of a color filter and a black matrix even if such structural members are used since the sputtering can be performed at a relatively low temperature (200° C.).

EXAMPLE 9

In this example, an electrode plate 1c as shown in FIG. 3 including, a principal electroconductive layer 12 and a protective layer 13 was prepared in the following manner and evaluated in the same manner as in Example 8.

Two substrates A9 and B9 were prepared in the same manner as in Example 8 except that a 1 μm-thick principal electroconductive layer 12 of copper and a 300 Å-thick protective layer 13 of nickel were formed by sputtering in this order on a 1.1 mm-thick glass substrate 2 (300×340 mm).

The sputtering was performed under the following conditions:
<for the copper layer 12>
  Substrate temperature: 200° C.
  Pressure: 3 mtorr
  Power: 7 kW
  Ar gas flow rate: 100 sccm
  Time: 12 min.
<for the nickel layer 13>
  Substrate temperature: 200° C.
  Pressure: 3 mtorr
  Power: 2 kW
  Ar gas flow rate: 100 sccm
  Time: 30 sec.

Then, the substrate B9 was subjected to annealing treatment for 2 hour at 200° C. under nitrogen atmosphere ($N_2$ gas pressure: 10 torr) in a chamber.

When the resultant copper layer 12 and nickel layer 13 was analyzed according to ESCA (electron spectroscopy for chemical analysis), the layers 12 and 13 were found to be doped with nitrogen to have a nitrided portion in a thickness (depth) of ca. 1000 Å. Further, the nitrided portion showed an N content of 2.0 at % as measured according to WDX and SIMS.

Then, the substrates A9 and B9 were subjected to measurement of surface roughness and the electrical conduction test in the same manner as in Example 8.

Figure 12:
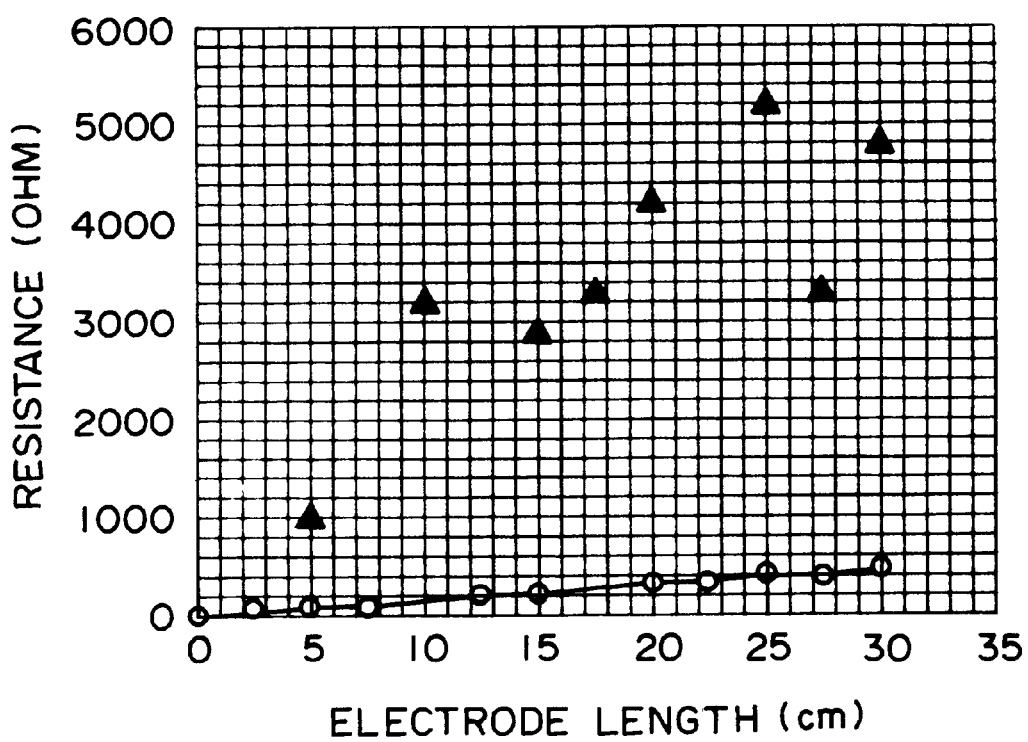

The results are shown in Table 8 and FIG. 12.

TABLE 8

| Substrate | A9 | B9 |
|---|---|---|
| N content*[4] (at %) | 0 | 2.0 |
| Surface rouahness*[5] (Å) | 80 | 500 |

As apparent from FIG. 12, the electrode plate using the substrate B9 (N content: 2.0 at %) according to the present invention was found to provide a linear relationship between the electrode length and the resistance, thus leading to a good electrical conduction state. On the other hand, the electrode plate using the substrate A9 (N content: 0 at %) was found to fail to provide a good electrical conduction state.

Further, when the surface roughness (500 Å) of the substrate B9 was changed to 100–600 Å, a similar linear relationship between the electrode length and the resistance was confirmed.

Further, as a result of the oxidation test, the substrate B9 (N content: 2 at %) did not cause oxidation of the metal electrodes but the substrate A9 (N content: 0 at %) caused oxidation.

According to this example, advantageous effects similar to Example 8 were brought about by the electrode plate of the present invention.

EXAMPLE 10

In this example, an electrode plate 1e as shown in FIG. 5 including an adhesive layer 11, a mixing layer 14, a principal electroconductive layer 12 and a protective layer 13 was prepared in the following manner and evaluated in the same manner as in Example 1.

Seven substrates A10–G10 were prepared in the same manner as in Example 1 except that a 300 Å-thick adhesive layer 11 of nickel-molybdenum (Ni—Mo) alloy (Mo: 15%) nitride, a ca. 150 Å-thick mixing layer 14 of Ni—Mo alloy nitride and copper nitride, a 1 μm-thick principal electroconductive layer 12 of copper and a 300 Å-thick protective layer 13 of Ni—Mo (Mo: 15%) alloy nitride were formed by sputtering in this order on a 1.1 mm-thick glass substrate 2 (300×340 mm).

The sputtering was performed under the following conditions:

<for the nitrided layers 11, 14 and 13>

Substrate temperature: 300° C.

Pressure: 5 mtorr

Ar gas flow rate: 100 sccm (fixed)

$N_2$ gas flow rate: controlled so as to provide a prescribed N content.

The mixing layer 14 was formed by co-sputtering with Ni—Mo (Mo: 15%) and copper.

<for the copper layer 12>

Substrate temperature: 300° C.

Pressure: 5 mtorr

Ar gas flow rate: 100 sccm

The evaluation results are shown in Table 9.

TABLE 9

| Substrate | A10 | B10 | C10 | D10 | E10 | F10 | G10 |
|---|---|---|---|---|---|---|---|
| N content (at %) | 0 | 5 | 10 | 25 | 40 | 50 | 60 |
| Number of peeled portion (piece(s)/20 pieces) | 5 | 0 | 0 | 0 | 0 | 0 | 0 |
| Surface roughness (Å) | 50 | 500 | 600 | 1000 | 1200 | 1200 | 1200 |
| Conduction test[*6] | x | o | o | o | o | o | o |
| Oxidation test[*6] | x | o | o | o | o | o | o |
| Rv ($\times 10^{-6}$ ohm · cm) | 2.1 | 2.1 | 2.1 | 2.1 | 2.1 | 2.1 | 2.1 |

(*6): "o" represented a good electrical conduction state (as indicated by the circular dots (o) in FIG NOS. 10–12) and "x" represented an inferior electrical conduction state (as indicated by the triangular dots (Δ) in FIGS. 10–12).
(*7): "o" represented no surface oxidation of the metal electrodes and "x" represented an occurrence of a surface oxidation of the metal electrodes.

In this example, by providing the metal electrodes 3 with two-layer structure including the adhesive layer 11, the mixing layer 14 and protective layer 13 each having an N content of 5–60 at % and the principal electroconductive layer 12, it was possible to improve an adhesiveness with the glass substrate 2 and a resistance to oxidation of the metal electrode 3.

EXAMPLES 11–17

Electrode plates using substrates A11 to G17 shown in Tables 10–16 were prepared and evaluated in the same manner as in Examples 1–10.

The sputtering conditions were as follows.

Substrate temperature: 300° C.
Pressure: 5 mtorr
Ar gas flow rate: 100 sccm
$N_2$ gas flow rate: controlled so as to provide a prescribed N content.

The annealing treatment for Examples 15 and 17 were performed at 200° C. for 2 hours (Example 15) and at 300° C. for 3 hours (Example 17), respectively, under $N_2$ gas pressure of 10 torr in a chamber.

The layer structures of metal electrodes 3 and evaluation results are shown below.

EXAMPLE 11

Adhesive layer 11:

300 Å-thick nickel nitride layer.
Principal electroconductive layer 12:
1 μm-thick copper layer.

TABLE 10

| Substrate | A11 | B11 | C11 | D11 | E11 | F11 | G11 |
|---|---|---|---|---|---|---|---|
| N content (at %) | 0 | 5 | 10 | 20 | 40 | 50 | 60 |
| Number of peeled portion (piece(s)/20 pieces) | 2 | 0 | 0 | 0 | 0 | 0 | 0 |
| Rv ($\times 10^{-6}$ ohm · cm) | 2.1 | 2.1 | 2.1 | 2.1 | 2.1 | 2.1 | 2.1 |

EXAMPLE 12

Adhesive layer 11:

300 Å-thick molybdenum nitride layer.
Principal electroconductive layer 12:
1 μm-thick copper layer.

TABLE 11

| Substrate | A12 | B12 | C12 | D12 | E12 | F12 | G12 |
|---|---|---|---|---|---|---|---|
| N content (at %) | 0 | 5 | 10 | 20 | 40 | 50 | 60 |
| Number of peeled portion (piece(s)/20 pieces) | 2 | 0 | 0 | 0 | 0 | 0 | 0 |
| Rv ($\times 10^{-6}$ ohm · cm) | 2.1 | 2.1 | 2.1 | 2.1 | 2.1 | 2.1 | 2.1 |

EXAMPLE 13

Adhesive layer 11:

300 Å-thick chromium nitride layer.
Mixing layer 14:
ca. 150 Å-thick nitrided layer of
chromium and copper (formed by co-sputtering).
Principal electroconductive layer 12:
1 μm-thick copper layer.

TABLE 12

| Substrate | A13 | B13 | C13 | D13 | E13 | F13 | G13 |
|---|---|---|---|---|---|---|---|
| N content (at %) | 0 | 5 | 10 | 20 | 40 | 50 | 60 |
| Number of peeled portion (piece(s)/20 pieces) | 5 | 0 | 0 | 0 | 0 | 0 | 0 |
| Rv ($\times 10^{-6}$ ohm · cm) | 2.1 | 2.1 | 2.1 | 2.1 | 2.1 | 2.1 | 2.1 |

EXAMPLE 14

Adhesive layer 11:

300 Å-thick aluminum nitride layer.
Mixing layer 14:
ca. 150 Å-thick nitrided layer of
aluminum and copper (formed by co-sputtering).
Principal electroconductive layer 12:
1 μm-thick copper layer.

TABLE 13

| Substrate | A14 | B14 | C14 | D14 | E14 | F14 | G14 |
|---|---|---|---|---|---|---|---|
| N content (at %) | 0 | 5 | 10 | 20 | 40 | 50 | 60 |
| Number of peeled portion (piece(s)/20 pieces) | 2 | 0 | 0 | 0 | 0 | 0 | 0 |
| Rv ($\times 10^{-6}$ ohm · cm) | 2.1 | 2.1 | 2.1 | 2.1 | 2.1 | 2.1 | 2.1 |

EXAMPLE 15

Principal electroconductive layer 12:

1 μm-thick copper layer.
Protective layer 13:
300 Å-thick nickel layer.
Nitrided portion:
1000 Å-thick (by annealing treatment).

TABLE 14

| Substrate | A15 | B15 | C15 | D15 | E15 | F15 | G15 |
|---|---|---|---|---|---|---|---|
| N content (at %) | 0 | 2 | 5 | 10 | 30 | 50 | 60 |
| Surface roughness (Å) | 80 | 500 | 600 | 1000 | 1000 | 1000 | 1000 |
| Conduction test | x | ○ | ○ | ○ | ○ | ○ | ○ |
| Oxidation test | x | ○ | ○ | ○ | ○ | ○ | ○ |
| Rv (× 10$^{-6}$ ohm · cm) | 2.1 | 2.1 | 2.1 | 2.1 | 2.1 | 2.1 | 2.1 |

EXAMPLE 16

Adhesive layer 11:
300 Å-thick molybdenum nitride layer.
Principal electroconductive layer 12:
2 μm-thick copper layer.
Protective layer 13:
300 Å-thick molybdenum nitride layer.

TABLE 15

| Substrate | A16 | B16 | C16 | D16 | E16 | F16 | G16 |
|---|---|---|---|---|---|---|---|
| N content (at %) | 0 | 5 | 10 | 20 | 40 | 50 | 60 |
| Number of peeled portion (piece(s)/20 pieces) | 2 | 0 | 0 | 0 | 0 | 0 | 0 |
| Surface roughness (Å) | 50 | 500 | 600 | 1000 | 1200 | 1200 | 1200 |
| Conduction test | x | ○ | ○ | ○ | ○ | ○ | ○ |
| Oxidation test | x | ○ | ○ | ○ | ○ | ○ | ○ |
| Rv (× 10$^{-6}$ ohm · cm) | 2.1 | 2.1 | 2.1 | 2.1 | 2.1 | 2.1 | 2.1 |

EXAMPLE 17

Adhesive layer 11:
300 Å-thick Ni—Mo (Mo: 15%) alloy layer.
Mixing layer 14:
ca. 150 Å-thick nitrided layer of
Ni—Mo (Mo: 15%) alloy and copper (formed by co-sputtering).
Principal electroconductive layer 12:
1 μm-thick copper layer.
Protective layer 13:
300 Å-thick Ni—Mo (Mo: 15%) alloy layer.
Nitrided portion:
2000 Å-thick (by annealing treatment).

TABLE 16

| Substrate | A17 | B17 | C17 | D17 | E17 | F17 | G17 |
|---|---|---|---|---|---|---|---|
| N content (at %) | 0 | 5 | 10 | 20 | 40 | 50 | 60 |
| Number of peeled portion (piece(s)/20 pieces) | 7 | 0 | 0 | 0 | 0 | 0 | 0 |
| Surface roughness (Å) | 50 | 500 | 660 | 1000 | 1200 | 1200 | 1200 |
| Conduction test | x | ○ | ○ | ○ | ○ | ○ | ○ |
| Oxidation test | x | ○ | ○ | ○ | ○ | ○ | ○ |
| Rv (× 10$^{-6}$ ohm · cm) | 2.1 | 2.1 | 2.1 | 2.1 | 2.2 | 2.4 | 2.9 |

As described hereinabove, according to the present invention, by incorporating a nitrided layer in each metal electrode constituting the electrode plate of the present invention, it is possible to prevent a surface oxidation leading to corrosion of metal electrodes and also to improve an adhesive property of metal electrodes with a glass substrate.

The liquid crystal device using the electrode plate according to the present invention shows a good electrical conduction between transparent electrodes and metal electrodes, thus preventing a voltage waveform distortion due to electrical signal delay.

What is claimed is:

1. An electrode plate, comprising: a light-transmissive substrate, a plurality of first electrodes disposed on the light-transmissive substrate and a plurality of second electrodes disposed on the first electrodes, wherein
    each first electrode is electrically connected with an associated second electrode, and
    said each first electrode has a laminate structure including a first layer disposed closer to the light-transmissive substrate, a second layer disposed closer to said associated second electrode, and a mixing layer disposed between the first and second layers, the mixing layer comprising a first metal element constituting the first layer and a second metal element constituting the second layer, wherein at least one of the first layer, the second layer and the mixing layer comprises a layer of metal nitride.

2. A plate according to claim 1, wherein the first layer comprises a metal or alloy selected from the group consisting of Cu, Ni, Mo, Cr, W, Ta, Al and Ag, and the second layer comprises Cu.

3. A plate according to claim 1, wherein the first layer comprises Cu, and the second layer comprises a metal or alloy selected from the group consisting of Cu, Ni, Mo, Cr, W, Ta and Ag.

4. A plate according to claim 1, wherein the first layer comprises a layer of metal nitride.

5. A plate according to claim 1, wherein the second layer comprises a layer of metal nitride.

6. A plate according to claim 1, wherein the mixing layer comprises a layer of metal nitride.

7. A plate according to claim 1, wherein said each first electrode comprises a third layer, disposed on the second layer, comprising a metal or alloy selected from the group consisting of Cu, Ni, Mo, Cr, W, Ta and Ag.

8. A plate according to claim 7, wherein the third layer comprises a layer of metal nitride.

9. A plate according to claim 1, wherein the first electrodes are disposed on the light-transmissive substrate with spacings therebetween, the spacings being filled with a polymeric material.

10. A plate according to claim 9, wherein the polymeric material comprises an ultraviolet-cured resin.

11. A process for producing an electrode plate comprising a light-transmissive substrate, a plurality of first electrodes disposed on the light-transmissive substrate and a plurality of second electrodes disposed on the first electrodes, said process comprising the steps of:
    forming on a light-transmissive substrate a plurality of first electrodes each comprising a layer of metal nitride, and
    forming on the first electrodes a plurality of second electrodes each comprising a transparent electrode so as to be electrically connected with an associated first electrode,
    wherein each first electrode has a laminate structure including a first layer disposed closer to the light-transmissive substrate, a second layer disposed closer to said associated second electrode, and a mixing layer disposed between the first and second layers, the mixing layer comprising a first metal element constituting the first layer and a second metal element constituting the second layer, and at least one of the first layer, the second layer and the mixing layer comprises a layer of metal nitride.

12. A process according to claim 11, wherein the first layer comprises a metal or alloy selected from the group consisting of Cu, Ni, Mo, Cr, W, Ta, Al and Ag, and the second layer comprises Cu.

13. A process according to claim 11, wherein the first layer comprises Cu, and the second layer comprises a metal or alloy selected from the group consisting of Cu, Ni, Mo, Cr, W, Ta and Ag.

14. A process according to claim 11, wherein the first layer comprises a layer of metal nitride.

15. A process according to claim 11, wherein the second layer comprises a layer of metal nitride.

16. A process according to claim 11, wherein the mixing layer comprises a layer of metal nitride.

17. A process according to claim 11, wherein said each first electrode comprises a third layer, disposed on the second layer, comprising a metal or alloy selected from the group consisting of Cu, Ni, Mo, Cr, W, Ta and Ag.

18. A process according to claim 17, wherein the third layer comprises a layer of metal nitride.

19. A process according to claim 11, wherein the first electrodes are disposed on the light-transmissive substrate with spacings therebetween, the spacings being filled with a polymeric material.

20. A process according to claim 19, wherein the polymeric material comprises an ultraviolet-cured resin.

21. A process for producing a liquid crystal device, comprising the steps of:
   providing a pair of electrode plates at least one of which is produced by a process according to claim 11,
   disposing the electrode plates opposite to each other while leaving a gap therebetween, and
   filling the gap with a liquid crystal.

22. A process according to claim 21, wherein the first layer comprises a metal or alloy selected from the group consisting of Cu, Ni, Mo, Cr, W, Ta, Al and Ag, and the second layer comprises Cu.

23. A process according to claim 21, wherein the first layer comprises Cu, and the second layer comprises a metal or alloy selected from the group consisting of Cu, Ni, Mo, Cr, W, Ta and Ag.

24. A process according to claim 21, wherein the first layer comprises a layer of metal nitride.

25. A process according to claim 21, wherein the second layer comprises a layer of metal nitride.

26. A process according to claim 21, wherein the mixing layer comprises a layer of metal nitride.

27. A process according to claim 21, wherein said each first electrode comprises a third layer, disposed on the second layer, comprising a metal or alloy selected from the group consisting of Cu, Ni, Mo, Cr, W, Ta and Ag.

28. A process according to claim 27, wherein the third layer comprises a layer of metal nitride.

29. A process according to claim 21, wherein the first electrodes are disposed on the light-transmissive substrate with spacings therebetween, the spacings being filled with a polymeric material.

30. A process according to claim 29, wherein the polymeric material comprises an ultraviolet-cured resin.

31. A liquid crystal device, comprising: a pair of electrode plates and a liquid crystal disposed between the electrode plates; at least one of the electrode plates comprising a light-transmissive substrate, a plurality of first electrodes disposed on the light-transmissive substrate and a plurality of second electrodes disposed on the first electrodes, wherein
   each first electrode is electrically connected with an associated second electrode, and
   said each first electrode has a laminate structure including a first layer disposed closer to the light-transmissive substrate, a second layer disposed closer to said associated second electrode, and a mixing layer disposed between the first and second layers, the mixing layer comprising a first metal element constituting the first layer and a second metal element constituting the second layer, wherein at least one of the first layer, the second layer and the mixing layer comprises a layer of metal nitride.

32. A plate according to claim 31, wherein the first layer comprises a metal or alloy selected from the group consisting of Cu, Ni, Mo, Cr. W, Ta, Al and Ag, and the second layer comprises Cu.

33. A device according to claim 31, wherein the first layer comprises Cu, and the second layer comprises a metal or alloy selected from the group consisting of Cu, Ni, Mo, Cr, W, Ta and Ag.

34. A device according to claim 31, wherein the first layer comprises a layer of metal nitride.

35. A device according to claim 31, wherein the second layer comprises a lay r of metal nitride.

36. A device according to claim 31, wherein the mixing layer comprises a layer of metal nitride.

37. A device according to claim 31, wherein said each first electrode comprises a third layer, disposed on the second layer, comprising a metal or alloy selected from the group consisting of Cu, Ni, Mo, Cr, W, Ta and Ag.

38. A device according to claim 37, wherein the third layer comprises a layer of metal nitride.

39. A device according to claim 31, wherein the first electrodes are disposed on the light-transmissive substrate with spacings therebetween, the spacings being filled with a polymeric material.

40. A device according to claim 39, wherein the polymeric material comprises an ultraviolet-cured resin.

* * * * *